(12) United States Patent
Kishimoto

(10) Patent No.: US 12,480,566 B2
(45) Date of Patent: Nov. 25, 2025

(54) DIFFERENTIAL GEAR UNIT

(71) Applicant: AISIN CORPORATION, Aichi (JP)

(72) Inventor: Kazuma Kishimoto, Kariya (JP)

(73) Assignee: AISIN CORPORATION, Kariya (JP)

(*) Notice: Subject to any disclaimer, the term of this patent is extended or adjusted under 35 U.S.C. 154(b) by 0 days.

(21) Appl. No.: 18/844,256

(22) PCT Filed: May 26, 2023

(86) PCT No.: PCT/JP2023/019668
§ 371 (c)(1),
(2) Date: Sep. 5, 2024

(87) PCT Pub. No.: WO2024/004471
PCT Pub. Date: Jan. 4, 2024

(65) Prior Publication Data
US 2025/0198493 A1    Jun. 19, 2025

(30) Foreign Application Priority Data
Jun. 29, 2022    (JP) .................. 2022-104866

(51) Int. Cl.
F16H 48/08 (2006.01)
F16H 48/40 (2012.01)
F16H 48/38 (2012.01)

(52) U.S. Cl.
CPC ............. *F16H 48/08* (2013.01); *F16H 48/40* (2013.01); *F16H 2048/385* (2013.01)

(58) Field of Classification Search
CPC ..... F16H 48/08; F16H 48/40; F16H 2048/385
(Continued)

(56) References Cited

U.S. PATENT DOCUMENTS 3,974,717 A * 8/1976 Breed ..................... F16H 48/34
475/233
5,215,506 A * 6/1993 Hara ....................... F16H 48/08
475/86

(Continued)

FOREIGN PATENT DOCUMENTS

CN    212297485 U  *  1/2021  .......... B60K 17/346
JP    S63-251636 A    10/1988

(Continued)

OTHER PUBLICATIONS

EP0864779A1 with english translation; Ullrich et al.; Apr. 8, 2025 (Year: 2025).*

(Continued)

Primary Examiner — Roger L Pang
(74) Attorney, Agent, or Firm — Oliff PLC

(57) ABSTRACT

A differential gear unit includes a first case member, a second case member, and an outer peripheral gear member. The first case member includes a clamped portion, a first fitted portion, and a second fitted portion. The second case member includes a first clamping portion and a first fitting portion. The outer peripheral gear member includes a second clamping portion and a second fitting portion. The clamped portion, the first clamping portion, and the second clamping portion are fixedly fastened together by a fastening member. The first fitted portion and the first fitting portion are located inward of the clamped portion, the second fitted portion, and the second fitting portion in a radial direction, and are arranged so as to overlap the clamped portion as viewed radially in the radial direction.

4 Claims, 3 Drawing Sheets

(58) Field of Classification Search
USPC .................. 475/230, 248, 220; 74/606 R
See application file for complete search history.

(56) References Cited

U.S. PATENT DOCUMENTS

| | | | |
|---|---|---|---|
| 10,596,901 B2 | 3/2020 | Yoshisaka et al. | |
| 2003/0054914 A1* | 3/2003 | Tomari | F16H 48/08 475/231 |
| 2005/0009662 A1 | 1/2005 | Sudou | |
| 2009/0098969 A1 | 4/2009 | Tabata et al. | |
| 2009/0192007 A1 | 7/2009 | Sudou | |
| 2013/0237363 A1* | 9/2013 | Fusegi | F16H 48/24 475/230 |
| 2016/0076636 A1 | 3/2016 | Kito et al. | |
| 2017/0292596 A1 | 10/2017 | Kamitani et al. | |
| 2018/0038475 A1 | 2/2018 | Nadayoshi et al. | |

FOREIGN PATENT DOCUMENTS

| | | |
|---|---|---|
| JP | 2005-069477 A | 3/2005 |
| JP | 2007-001483 A | 1/2007 |
| JP | 2008-196652 A | 8/2008 |
| JP | 2016-121810 A | 7/2016 |
| JP | 2021-008905 A | 1/2021 |
| WO | 2022/102290 A1 | 5/2022 |

OTHER PUBLICATIONS

English translation of CN212297485U; https://translationportal.epo.org; Apr. 8, 2025 (Year: 2025).*
Aug. 15, 2023 International Search Report issued in International Patent Application No. PCT/JP2023/019668.
Mar. 13, 2025 Extended Search Report issued in European Patent Application No. 23830922.3.

* cited by examiner

US 12,480,566 B2

DIFFERENTIAL GEAR UNIT

TECHNICAL FIELD

The present disclosure relates to a differential gear unit including a differential case.

BACKGROUND ART

A differential gear unit including a differential case is known in the art. Japanese Unexamined Patent Application Publication No. 2016-121810 (JP 2016-121810 A) (Patent Document 1) describes a differential case including a first case member and a second case member. In this differential gear unit, a clamped portion of the first case member is clamped between an outer peripheral gear member and the second case member, and they are fastened together by bolts.

RELATED ART DOCUMENTS

Patent Documents

Patent Document 1: Japanese Unexamined Patent Application Publication No. 2016-121810 (JP 2016-121810 A)

SUMMARY OF THE DISCLOSURE

Problem to be Solved by the Disclosure

In the differential gear unit described in Patent Document 1, the second case member, the first case member, and the outer peripheral gear member are arranged in this order from one side in the axial direction, and a radial fitting portion between the second case member and the first case member and a radial fitting portion between the first case member and the outer peripheral gear member are arranged side by side in the axial direction. It is therefore difficult to reduce the size of the differential gear unit in the axial direction.

Accordingly, it is desired to implement a differential gear unit that can have a smaller size in the axial direction.

Means for Solving the Problem

A differential gear unit according to the present disclosure is a differential gear unit including: a differential gear mechanism including a plurality of differential gears that mesh with each other; a differential case that houses the differential gear mechanism and that rotates about a predetermined rotation axis; and an outer peripheral gear member that rotates with the differential case. The differential case includes a first case member and a second case member. The first case member includes: a clamped portion clamped between the outer peripheral gear member and the second case member in an axial direction; a first fitted portion in which the second case member fits in a radial direction; and a second fitted portion on which the outer peripheral gear member fits in the radial direction. The second case member includes: a first clamping portion that contacts the clamped portion from a first side in the axial direction; and a first fitting portion that fits in the first fitted portion on an inner side in the radial direction. The outer peripheral gear member includes: a second clamping portion that contacts the clamped portion from a second side in the axial direction; and a second fitting portion that fits on the second fitted portion on an outer side in the radial direction. The clamped portion, the first clamping portion, and the second clamping portion are fixedly fastened together by a fastening member. The first fitted portion and the first fitting portion are located inward of the clamped portion, the second fitted portion, and the second fitting portion in the radial direction, and are arranged so as to overlap the clamped portion as viewed radially in the radial direction. The axial direction is a direction along the rotation axis, the radial direction is a direction perpendicular to the rotation axis, the first side in the axial direction is one side in the axial direction, and the second side in the axial direction is the other side in the axial direction.

According to this configuration, the first fitted portion and the first fitting portion are arranged so as to overlap the clamped portion as viewed in the radial direction. This configuration facilitates a reduction in size of the differential case in the axial direction and therefore a reduction in size of the differential gear unit in the axial direction, compared to a case where the first fitted portion and the first fitting portion are arranged offset in the axial direction from the clamped portion.

Further features and advantages of the technique according to the present disclosure will become more apparent from the following description of illustrative, non-limiting embodiments that will be given with reference to the drawings.

MODES FOR CARRYING OUT THE DISCLOSURE

First Embodiment

Figure 1:
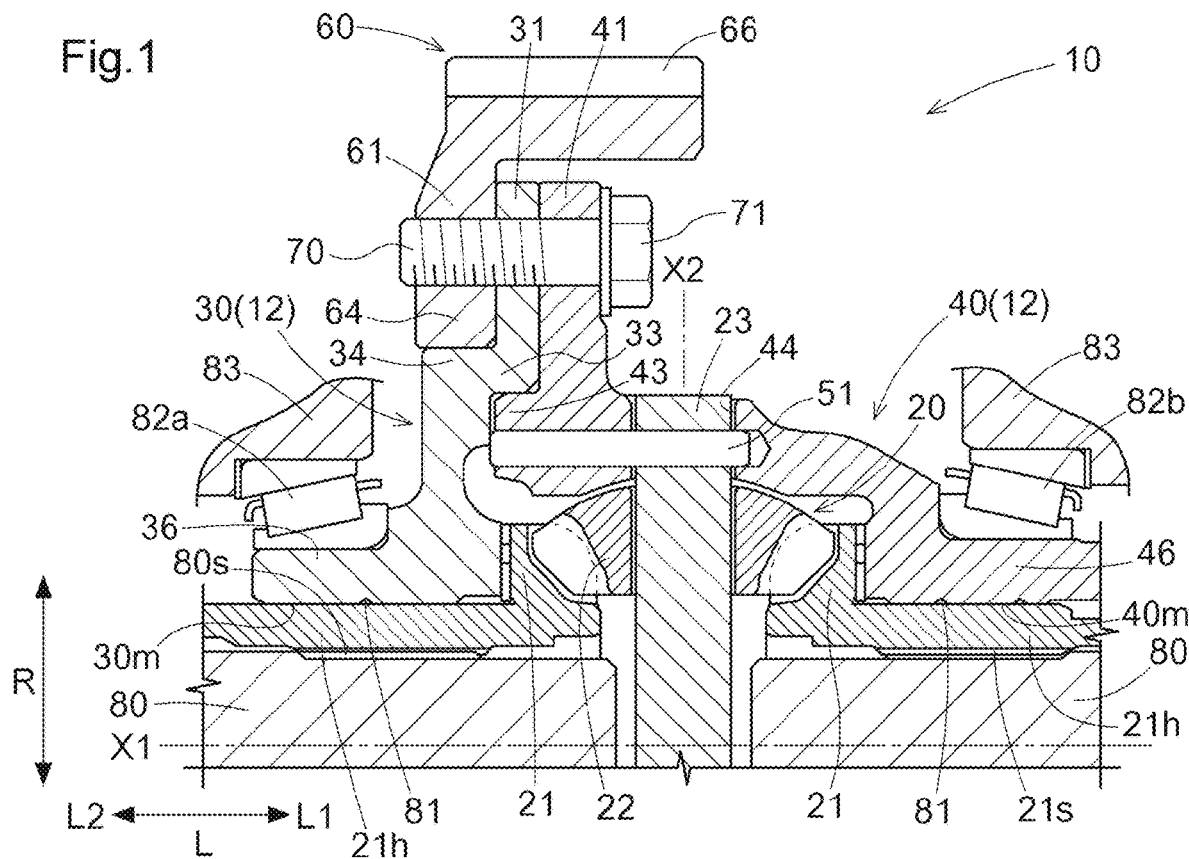
FIG. 1 is a sectional view of a differential gear unit according to a first embodiment.

Hereinafter, a differential gear unit 10 according to a first embodiment will be described with reference to the drawings. FIG. 1 is a sectional view of the differential gear unit 10. For example, the differential gear unit 10 is interposed between a vehicle driving source, not shown, and a pair of right and left drive wheels. The differential gear unit 10 includes: a differential gear mechanism 20 having a plurality of differential gears 21, 22 that mesh with each other; a differential case 12 that houses the differential gear mechanism 20 and that rotates about a predetermined rotation axis, and an outer peripheral gear member 60 that rotates with the differential case 12. The differential case 12 includes a first case member 30 and a second case member 40. In the present embodiment, a plurality of differential gears is a pair of first bevel gears 21 and a pair of second bevel gears 22. The direction along a rotation axis X1 is defined as the axial direction L, and the direction perpendicular to the rotation axis X1 is defined as the radial direction R. One side in the axial direction L will be referred to as the first side L1 in the axial direction, and the other side in the axial direction L will be referred to as the second side L2 in the axial direction.

Figure 2:
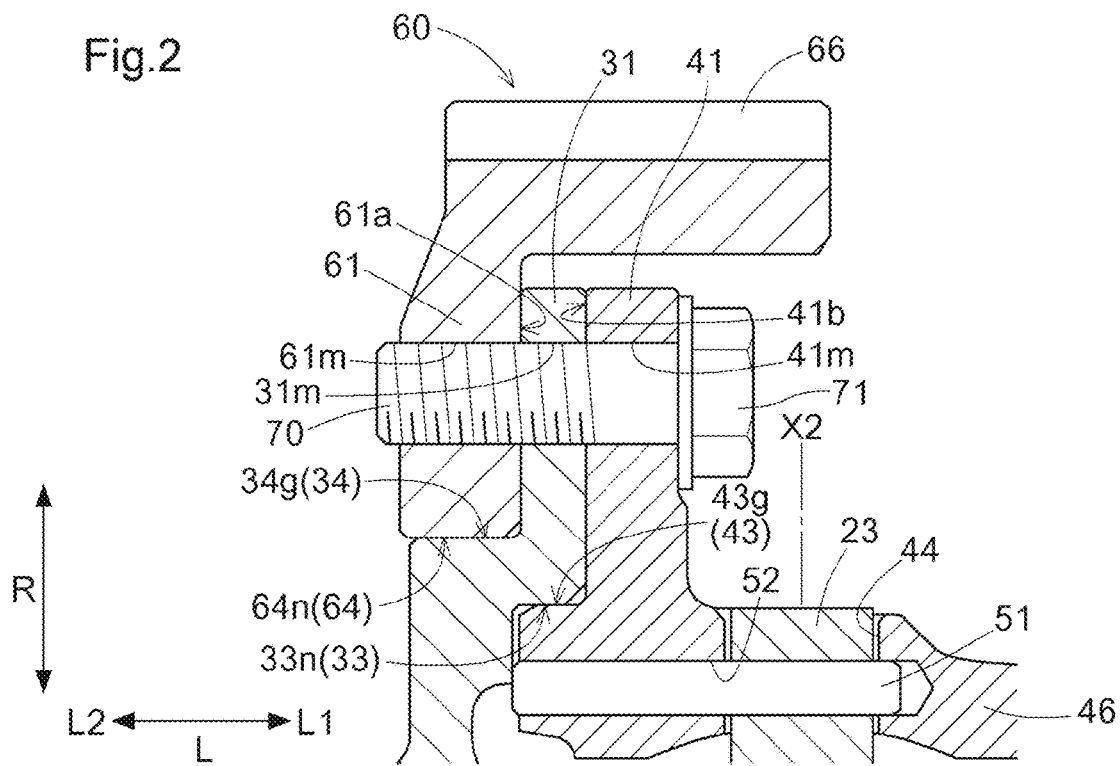
FIG. 2 is an enlarged view of around a clamped portion according to the first embodiment.

FIG. 2 is an enlarged view of around a clamped portion 31 of the first case member 30. The first case member 30 includes: the clamped portion 31 clamped between the outer peripheral gear member 60 and the second case member 40 in the axial direction L; a first fitted portion 33 in which the second case member 40 fits in the radial direction R; and a second fitted portion 34 on which the outer peripheral gear member 60 fits in the radial direction R. In the present embodiment, the first fitted portion 33 includes a first fitting inner peripheral surface 33n facing inward in the radial direction R. The second fitted portion 34 includes a second fitting outer peripheral surface 34g facing outward in the radial direction R. The second fitting outer peripheral surface 34g is located outward of the first fitting inner peripheral surface 33n in the radial direction R.

The second case member 40 includes a first clamping portion 41 that contacts the clamped portion 31 from the first side L1 in the axial direction, and a first fitting portion 43 that fits in the first fitted portion 33 on the inner side in the radial direction R. In the present embodiment, a first clamping portion 41 includes a first joint surface 41b facing the second side L2 in the axial direction, and the first joint surface 41b contacts the surface of the clamped portion 31 that is located on the first side L1 in the axial direction. In the present embodiment, the first fitting portion 43 includes a first fitting outer peripheral surface 43g facing outward in the radial direction R. The first fitting outer peripheral surface 43g fits in the first fitting inner peripheral surface 33n of the clamped portion 31.

The outer peripheral gear member 60 includes a second clamping portion 61 that contacts the clamped portion 31 from the second side L2 in the axial direction, and a second fitting portion 64 that fits on the second fitted portion 34 on the outer side in the radial direction R. In the present embodiment, the second clamping portion 61 includes a second joint surface 61a facing the first side L1 in the axial direction, and the second joint surface 61a contacts the surface of the clamped portion 31 that is located on the second side L2 in the axial direction. In the present embodiment, the second fitting portion 64 includes a second fitting inner peripheral surface 64n facing inward in the radial direction R. The second fitting inner peripheral surface 64n fits on the second fitting outer peripheral surface 34g of the clamped portion 31.

The clamped portion 31, the first clamping portion 41, and the second clamping portion 61 are fixedly fastened together by a fastening member 70. The first case member 30, the outer peripheral gear member 60, and the second case member 40 are thus joined together. In the present embodiment, the clamped portion 31, the first clamping portion 41, and the second clamping portion 61 are arranged so as to overlap each other as viewed in the axial direction L. Regarding the arrangement of a plurality elements, "overlap as viewed in a specific direction" means that, when an imaginary straight line parallel to this viewing direction is moved in directions perpendicular to the imaginary straight line, there is an area where the imaginary straight line intersects all of the plurality of elements. In the present embodiment, the fastening member 70 is a headed bolt.

Figure 5:
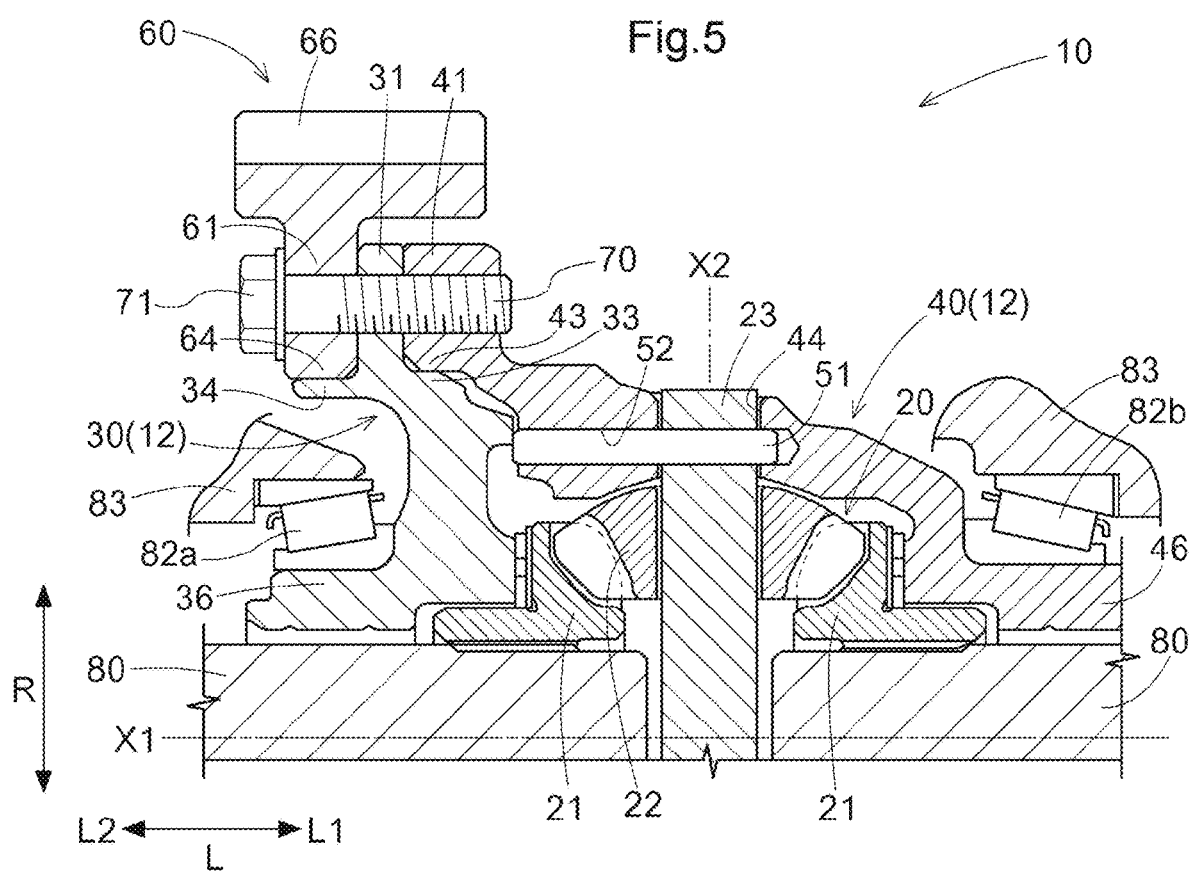
FIG. 5 is a sectional view of a differential gear unit of a comparative example.

As shown in FIG. 1, the first fitted portion 33 and the first fitting portion 43 are located inward of the clamped portion 31, the second fitted portion 34, and the second fitting portion 64 in the radial direction R, and are arranged so as to overlap the clamped portion 31 as viewed radially in the radial direction R. This configuration facilitates a reduction in size of the differential case 12 in the axial direction L and therefore a reduction in size of the differential gear unit 10 in the axial direction L, compared to a case where the first fitted portion 33 and the first fitting portion 43 are arranged offset in the axial direction L from the clamped portion 31 as in a comparative example shown in FIG. 5. Although the comparative example shown in FIG. 5 is not an embodiment of the technique related to the present disclosure, the same signs as those in FIG. 1 are used in FIG. 5 for easy comparison with the embodiment (FIG. 1) of the technique related to the present disclosure.

In the present embodiment, the second fitted portion 34 and the second fitting portion 64 are located on the second side L2 in the axial direction with respect to the clamped portion 31. The second fitted portion 34 and the second fitting portion 64 are located outward of the first fitted portion 33 and the first fitting portion 43 in the radial direction R. This configuration allows the second fitted portion 34 and the second fitting portion 64 to be appropriately disposed, and further facilitates a reduction in size of the differential case 12 and the differential gear unit 10 in the axial direction L. The first fitted portion 33 and the first fitting portion 43 may be arranged so as to overlap the second fitted portion 34 and the second fitting portion 64 as viewed radially in the radial direction R. For example, the first fitted portion 33 and the first fitting portion 43 may be arranged such that part of the first fitted portion 33 and part of the first fitting portion 43 that are located on the second side L2 in the axial direction overlap part of the second fitted portion 34 and part of the second fitting portion 64 that are located on the first side L1 in the axial direction, as viewed in the radial direction.

In the present embodiment, the outer peripheral gear member 60 has outer peripheral gear teeth 66 formed outward of the second clamping portion 61 in the radial direction R and the second fitting portion 64 so as to protrude toward the first side L1 in the axial direction with respect to the second clamping portion 61. In the present embodiment, the first fitted portion 33 and the first fitting portion 43 are arranged so as to overlap the outer peripheral gear teeth 66 as viewed in the radial direction. This configuration facilitates a reduction in size of the differential gear unit 10 in the axial direction L, compared to a case where the first fitted portion 33 and the first fitting portion 43 are arranged offset in the axial direction L from the outer peripheral gear teeth 66. In the illustrated example, the outer peripheral gear teeth 66 are helical teeth.

In the present embodiment, the differential gear mechanism 20 includes: the pair of first bevel gears 21 that is supported so as to be rotatable relative to the differential case 12 about the rotation axis X1; and the plurality of second bevel gears 22 that is rotatably supported by a gear support shaft 23 extending in the radial direction R and that meshes with the pair of first bevel gears 21. In the present embodiment, the pair of first bevel gears 21 is disposed on both sides of the gear support shaft 23 in the axial direction L. The second bevel gears 22 are provided in a pair, and are supported spaced apart from each other in the radial direction R so as to be rotatable about an axis X2 of the gear support shaft 23.

In the present embodiment, the gear support shaft 23 is supported by the second case member 40. The gear support shaft 23 is disposed so as to overlap the outer peripheral gear teeth 66 as viewed in the radial direction. This configuration allows the axial middle position of the differential gear mechanism 20 and the axial middle positions of the outer peripheral gear teeth 66 to be more easily located closer to each other in the axial direction L. This facilitates a reduction in size of the differential gear unit 10 in the axial direction L. In the illustrated example, the gear support shaft 23 is supported by the second case member 40 so as to rotate with the differential case 12. The gear support shaft 23 is inserted through a pair of shaft insertion holes 44 that is through holes formed in the radial direction R in the differential case 12. The overlap between the gear support shaft 23 and the outer peripheral gear teeth 66 as viewed in the radial direction may be a partial overlap, or the entire gear support shaft 23 may overlap with the outer peripheral gear teeth 66 as viewed in the radial direction. In the illustrated example, the gear support shaft 23 is disposed such that its axis X2 overlaps the outer peripheral gear teeth 66 as viewed in the radial direction.

In the present embodiment, the differential gear unit 10 includes a restricting member 51 that is inserted through both the second case member 40 and the gear support shaft 23 in the axial direction L in order to restrict movement of the gear support shaft 23 with respect to the second case member 40 in the radial direction R. The first fitted portion 33 and the first fitting portion 43 are arranged so as to overlap the restricting member 51 as viewed in the radial direction. In this configuration, in the case where the gear support shaft 23 and the restricting member 51 for restricting movement of the gear support shaft 23 are attached to the second case member 40, the first fitted portion 33 and the first fitting portion 43 are arranged so as to overlap the restricting member 51 as viewed in the radial direction. This configuration facilitates a reduction in size of the differential gear unit 10 in the axial direction L, compared to a case where the first fitted portion 33 and the first fitting portion 43 are arranged offset in the axial direction L from the restricting member 51 as in the comparative example shown in FIG. 5.

In the example shown in FIG. 2, the restricting member 51 is a rod-shaped retaining pin extending in the axial direction L. In the example shown in FIG. 2, the restricting member 51 is inserted into a restricting hole 52 in the second case member 40 from the second side L2 in the axial direction, and is retained by the surface of the first case member 30 that faces the first side L1 in the axial direction.

In the present embodiment, a head 71 of the bolt that serves as the fastening member 70 is located on the first side L1 in the axial direction with respect to the first clamping portion 41 of the second case member 40. The head 71 of the bolt is disposed so as to overlap the outer peripheral gear teeth 66 as viewed in the radial direction. This can avoid the head 71 of the bolt protruding toward the second side L2 in the axial direction beyond the outer peripheral gear teeth 66. This configuration facilitates a further reduction in size of the differential gear unit 10 in the axial direction L. The overlap between the head 71 of the bolt and the outer peripheral gear teeth 66 as viewed in the radial direction may be a partial overlap, or the entire head 71 of the bolt may overlap the outer peripheral gear teeth 66 as viewed in the radial direction.

In the example shown in FIG. 2, an insertion portion 41m of the first clamping portion 41 through which the bolt (fastening member 70) is inserted is a through hole. An insertion portion 31m of the clamped portion 31 through which the bolt (fastening member 70) that it the fastening member 70 is inserted is a through hole. An insertion portion 61m of the second clamping portion 61 through which the bolt (fastening member 70) is inserted is an internally threaded hole.

In the example shown in FIG. 2, the head 71 of the bolt is disposed so as to overlap the gear support shaft 23 as viewed in the radial direction. The overlap between the head 71 of the bolt and the gear support shaft 23 as viewed in the radial direction may be a partial overlap, or the entire head 71 of the bolt may overlap the gear support shaft 23 as viewed in the radial direction. It is desirable that the first clamping portion 41 of the second case member 40 be disposed on the second side L2 in the axial direction with respect to the gear support shaft 23 as viewed in the radial direction. In other words, it is desirable that the first clamping portion 41 be disposed so as not to overlap the gear support shaft 23 as viewed in the radial direction.

In the present embodiment, the differential gear mechanism 20 is configured to be connected to a pair of output shafts 80 to distribute rotation of the outer peripheral gear member 60 to the pair of output shafts 80. In the present embodiment, the outer peripheral gear member 60 is an input element of the differential gear mechanism 20, and the pair of output shafts 80 is output elements of the differential gear mechanism 20. The pair of output shafts 80 is connected to drive wheels, not shown.

In the present embodiment, the pair of output shafts 80 is connected to the differential gear mechanism 20 so as to extend on both sides in the axial direction L from the differential gear mechanism 20. In the present embodiment, the pair of first bevel gears 21 is connected to the pair of output shafts 80. In the illustrated example, each of the pair of first bevel gears 21 includes a tubular portion 21h extending in the axial direction L, and splines 21s are formed on the inner peripheral surface of the tubular portion 21h. Splines 80s that mate with the splines 21s of the first bevel gears 21 are formed in the outer peripheral surfaces of the pair of output shafts 80. As these splines engage with each other, the pair of first bevel gears 21 and the pair of output shafts 80 rotate together.

In the present embodiment, the first case member 30 has a first through hole 30m through which the output shaft 80 is inserted in the axial direction L. The second case member 40 also has a second through hole 40m through which the output shaft 80 is inserted in the axial direction L. In the illustrated example, the first through hole 30m and the second through hole 40m are located coaxially. In the illustrated example, the tubular portions 21h of the pair of first bevel gears 21, together with the output shafts 80, are inserted through the first through hole 30m and the second through hole 40m. A spiral groove 81 for guiding lubricating oil into the differential case 12 is formed in each of the inner peripheral surface of the first through hole 30m and the inner peripheral surface of the second through hole 40m.

In the present embodiment, either or both of the first case member 30 and the second case member 40 are tubular members. The first case member 30 and the second case member 40 are fixedly fastened together by the fastening member 70, so that the differential gear mechanism 20 is housed in the differential case 12.

In the present embodiment, the first case member 30 includes a first tubular portion 36 formed so as to surround the first through hole 30m. The second case member 40 also includes a second tubular portion 46 formed so as to surround the second through hole 40m. The first tubular portion 36 and the second tubular portion 46 are supported by a housing 83 that is a non-rotating member via a differential case bearing 82a and a differential case bearing 82b, respectively, so as to be rotatable about the rotation axis X1. The first case member 30, the second case member 40, and the outer peripheral gear member 60 are thus supported by the housing 83 so as to be rotatable about the rotation axis X1. That is, the first case member 30 includes the first tubular portion 36 that functions as a supported portion supported by the differential case bearing 82a, and the second case member 40 includes the second tubular portion 46 that functions as a supported portion supported by the differential case bearing 82b. The differential case 12 is thus supported by the non-rotating member via the pair of differential case bearings 82a, 82b that is disposed spaced apart from each other in the axial direction L.

In the present embodiment, the second fitted portion 34 and the second fitting portion 64 are disposed on the first side L1 in the axial direction with respect to the differential case bearing 82a so as not to overlap the differential case bearing 82a as viewed in the radial direction. Moreover, in the present embodiment, the outer peripheral gear teeth 66 (in the illustrated example, the entire outer peripheral gear member 60) are disposed on the first side L1 in the axial direction with respect to the differential case bearing 82a so as not to overlap the differential case bearing 82a as viewed in the radial direction.

Second Embodiment

Figure 3:
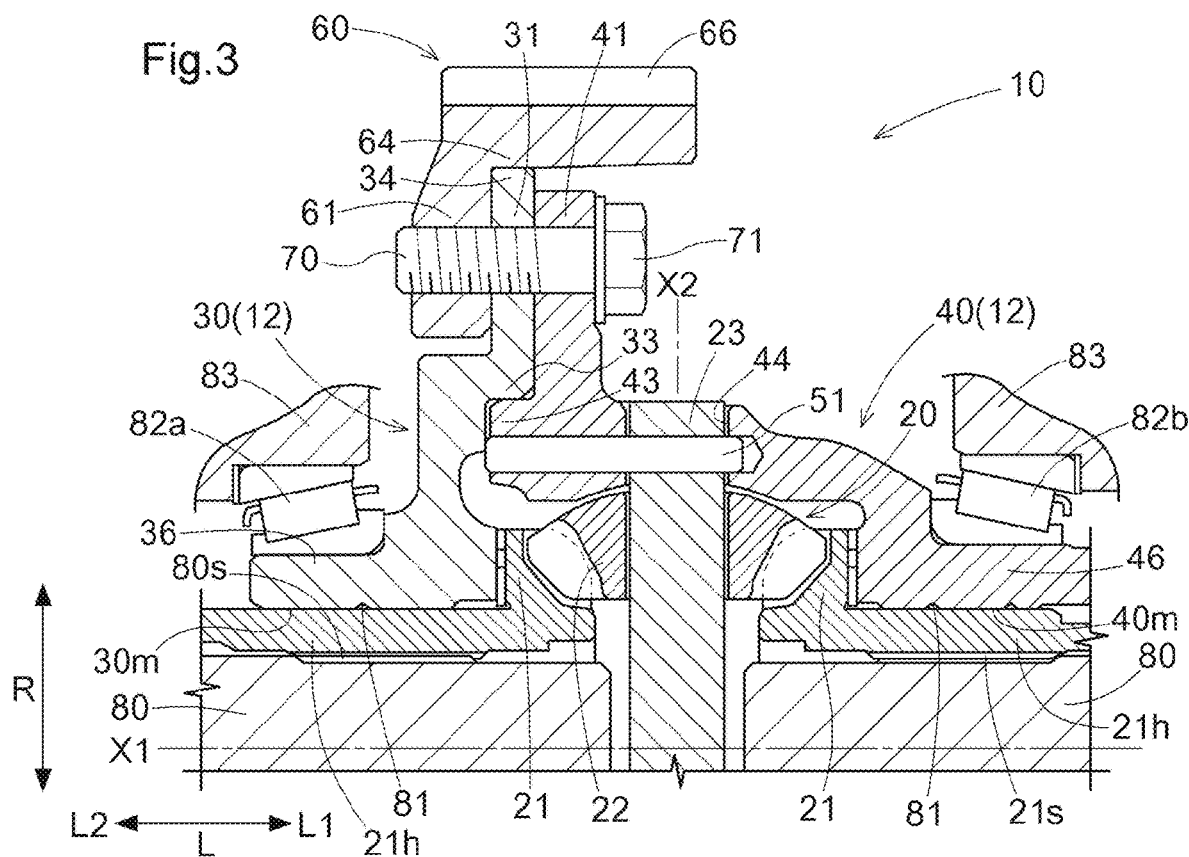
FIG. 3 is a sectional view of a differential gear unit according to a second embodiment.
Figure 4:
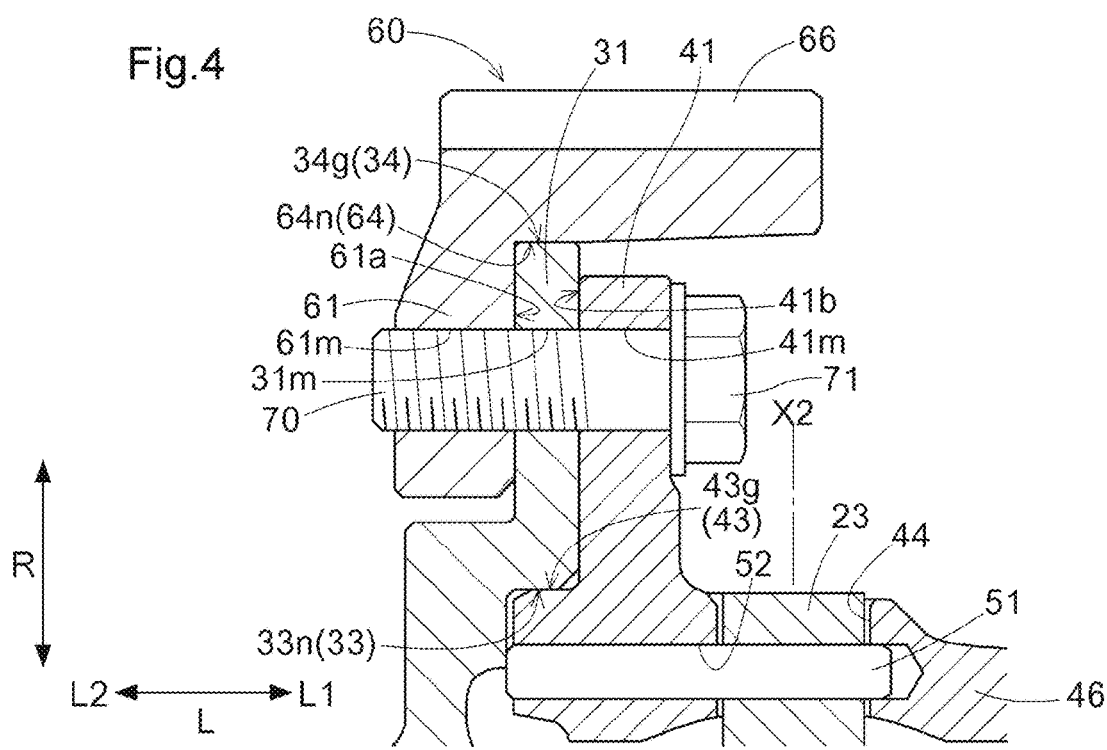
FIG. 4 is an enlarged view of around a clamped portion according to the second embodiment.

Hereinafter, the differential gear unit 10 according to a second embodiment will be described with reference to the drawings. The present embodiment is different from the first embodiment in arrangement of the second fitted portion 34 and the second fitting portion 64. The following description focuses on the differences from the first embodiment. The second embodiment is the same as the first embodiment in terms of those points that are not particularly described below. FIG. 3 is a sectional view of the differential gear unit 10. FIG. 4 is an enlarged view of around the clamped portion 31 of the first case member 30. In the present embodiment, the second fitted portion 34 and the second fitting portion 64 are arranged so as to overlap the clamped portion 31 as viewed radially in the radial direction R. This configuration allows the second fitted portion 34 and the second fitting portion 64 to be appropriately disposed, and further facilitates a reduction in size of the differential case 12 and the differential gear unit 10 in the axial direction L. This configuration also makes it easier to increase the rigidity of the outer peripheral gear teeth 66.

Other Embodiments

Other embodiments of the differential gear unit 10 will now be described.

(1) The above embodiments illustrate an example in which the differential gear mechanism 20 includes the first bevel gears 21 and the second bevel gears 22. However, the present disclosure is not limited to such a configuration. For example, the differential gear mechanism 20 may be a planetary gear transmission. In this case, gears of the planetary gear mechanism are "differential gears."

(2) The above embodiments illustrate an example in which the differential case 12 is divided into two parts, namely the first case member 30 and the second case member 40. However, the present disclosure is not limited to such a configuration. For example, the first case member 30 or the second case member 40 may further be divided. Namely, the differential case 12 may be divided into three or more parts.

(3) The above embodiments illustrate an example in which the first fitted portion 33 and the first fitting portion 43 are arranged so as to overlap the outer peripheral gear teeth 66 as viewed in the radial direction. However, the present disclosure is not limited to such a configuration. For example, the first fitted portion 33 and the first fitting portion 43 may be disposed on the second side L2 in the axial direction with respect to the outer peripheral gear teeth 66.

(4) The above embodiments illustrate an example in which the gear support shaft 23 that rotatably supports the second bevel gear 22 and the restricting member 51 that restricts movement of the gear support shaft 23 in the radial direction R are provided. However, the present disclosure is not limited to such a configuration. For example, the gear support shaft 23 and the restricting member 51 may not be provided.

(5) The above embodiments illustrate an example in which the fastening member 70 is a headed bolt. However, the present disclosure is not limited to such a configuration. For example, the fastening member 70 may be a nut, a fully threaded bolt, a double threaded bolt, etc.

(6) The configuration disclosed in each of the above embodiments can be applied in combination with the configurations disclosed in the other embodiments as long as no contradiction arises. Regarding the other configurations as well, the embodiments disclosed in the present specification are merely illustrative in all respects. Therefore, various modifications can be made as appropriate without departing from the spirit of the present disclosure.

Summary of Embodiments

The article transport vehicle described above will now be described.

The differential gear unit (10) according to the present disclosure is a differential gear unit (10) including: a differential gear mechanism (20) including a plurality of differential gears (21, 22) that mesh with each other; a differential case (12) that houses the differential gear mechanism (20) and that rotates about a predetermined rotation axis (X1); and an outer peripheral gear member (60) that rotates with the differential case (12). The differential case (12) includes a first case member (30) and a second case member (40). The first case member (30) includes: a clamped portion (31) clamped between the outer peripheral gear member (60) and the second case member (40) in an axial direction L; a first fitted portion (33) in which the second case member (40) fits in a radial direction R; and a second fitted portion (34) on which the outer peripheral gear member (60) fits in the radial direction R. The second case member (40) includes: a first clamping portion (41) that contacts the clamped portion (31) from a first side (L1) in the axial direction; and a first fitting portion (43) that fits in the first fitted portion (33) on an inner side in the radial direction R. The outer peripheral gear member (60) includes: a second clamping portion (61) that contacts the clamped portion (31) from a second side (L2) in the axial direction; and a second fitting portion (64) that fits on the second fitted portion (34) on an outer side in the radial direction R. The clamped portion (31), the first clamping portion (41), and the second clamping portion (61) are fixedly fastened together by a fastening member (70). The first fitted portion (33) and the first fitting portion (43) are located inward of the clamped portion (31), the second fitted portion (34), and the second fitting portion (64) in the radial direction (R), and are arranged so as to overlap the clamped portion (31) as viewed radially in the radial direction (R). The axial direction (L) is a direction along the rotation axis (X1), the radial direction (R) is a direction perpendicular to the rotation axis (X1), the first side (L1) in the axial direction is one side in the axial direction (L), and the second side (L2) in the axial direction is the other side in the axial direction (L1). This configuration facilitates a reduction in size of the differential case (12) in the axial direction (L) and therefore a reduction in size of the differential gear unit (10) in the axial direction (L), compared to a case where the first fitted portion (33) and the first fitting portion (43) are arranged offset in the axial direction (L) from the clamped portion (31).

In one aspect, it is suitable that the outer peripheral gear member (60) include outer peripheral gear teeth (66) formed outward of the second clamping portion (61) and the second fitting portion (64) in the radial direction (R) so as to protrude toward the first side (L1) in the axial direction with respect to the second clamping portion (61), and that the first fitted portion (33) and the first fitting portion (43) be arranged so as to overlap the outer peripheral gear teeth (66) as viewed in the radial direction. This configuration facilitates a reduction in size of the differential gear unit (10) in the axial direction (L), compared to a case where the first fitted portion (33) and the first fitting portion (43) are arranged offset in the axial direction (L) from the outer peripheral gear teeth (66).

In one aspect, it is suitable that the differential gear mechanism (20) include: a pair of first bevel gears (21) that is supported so as to be rotatable relative to the differential case (12) about the rotation axis (X1); and a plurality of second bevel gears (22) that is rotatably supported by a gear support shaft (23) extending in the radial direction R and that meshes with the pair of first bevel gears (21), that the gear support shaft (23) be supported by the second case member (40), and that the gear support shaft (23) be disposed so as to overlap the outer peripheral gear teeth (66) as viewed in the radial direction. This configuration allows the axial middle position of the differential gear mechanism (20) and the axial middle positions of the outer peripheral gear teeth (66) to be more easily located closer to each other in the axial direction (L). This facilitates a reduction in size of the differential gear unit (10) in the axial direction (L).

In one aspect, the differential gear unit (10) further includes a restricting member (51) that is inserted through both the second case member (40) and the gear support shaft (23) in the axial direction (L) in order to restrict movement of the gear support shaft (23) with respect to the second case member (40) in the radial direction (R). It is suitable that the first fitted portion (33) and the first fitting portion (43) be arranged so as to overlap the restricting member (51) as viewed in the radial direction. In this configuration, in the case where the gear support shaft (23) and the restricting member (51) for restricting movement of the gear support shaft (23) are attached to the second case member (40), the first fitted portion (33) and the first fitting portion (43) are arranged so as to overlap the restricting member (51) as viewed in the radial direction. This configuration facilitates a reduction in size of the differential gear unit (10) in the axial direction (L), compared to a case where the first fitted portion (33) and the first fitting portion (43) are arranged offset in the axial direction (L) from the restricting member (51).

In one aspect, a head (71) of a bolt that serves as the fastening member (70) is located on the first side (L1) in the axial direction with respect to the first clamping portion (41) of the second case member (40). It is suitable that the head (71) be disposed so as to overlap the outer peripheral gear teeth (66) as viewed in the radial direction. This can avoid the head (71) of the bolt protruding toward the second side (L2) in the axial direction beyond the outer peripheral gear teeth (66). This configuration facilitates a further reduction in size of the differential gear unit (10) in the axial direction (L).

DESCRIPTION OF THE REFERENCE NUMERALS

10: differential gear unit, 12: differential case, 20: differential gear mechanism, 21: first bevel gear (differential gear), 22: second bevel gear (differential gear) 23: gear support shaft, 30: first case member, 31: clamped portion, 33: first fitted portion, 34: second fitted portion, 40: second case member, 41: first clamping portion, 43: first fitting portion, 51: restricting member, 60: outer peripheral gear member, 61: second clamping portion, 64: second fitting portion, 66: outer peripheral gear teeth, 70: fastening member, 71: head

The invention claimed is:

1. A differential gear unit, comprising:
a differential gear mechanism including a plurality of differential gears that mesh with each other;
a differential case that houses the differential gear mechanism and that rotates about a predetermined rotation axis; and
an outer peripheral gear member that rotates with the differential case, wherein
the differential case includes a first case member and a second case member,
the first case member includes a clamped portion clamped between the outer peripheral gear member and the second case member in an axial direction, a first fitted portion in which the second case member fits in a radial direction, and a second fitted portion on which the outer peripheral gear member fits in the radial direction,
the second case member includes a first clamping portion that contacts the clamped portion from a first side in the axial direction, and a first fitting portion that fits in the first fitted portion on an inner side in the radial direction,
the outer peripheral gear member includes a second clamping portion that contacts the clamped portion from a second side in the axial direction, and a second fitting portion that fits on the second fitted portion on an outer side in the radial direction,
the clamped portion, the first clamping portion, and the second clamping portion are fixedly fastened together by a fastening member,
the first fitted portion and the first fitting portion are located inward of the clamped portion, the second fitted portion, and the second fitting portion in the radial direction, and are arranged so as to overlap the clamped portion as viewed radially in the radial direction, the axial direction being a direction along the rotation axis, the radial direction being a direction perpendicular to the rotation axis, the first side in the axial direction being one side in the axial direction, and the second side in the axial direction being the other side in the axial direction,
the outer peripheral gear member includes outer peripheral gear teeth formed radially outward of the second clamping portion and the second fitting portion so as to protrude toward the first side in the axial direction with respect to the second clamping portion,
the first fitted portion and the first fitting portion are arranged so as to overlap the outer peripheral gear teeth as viewed in the radial direction,
the differential gear mechanism includes a pair of first bevel gears that is supported so as to be rotatable relative to the differential case about the rotation axis, and a plurality of second bevel gears that is rotatably supported by a gear support shaft extending in the radial direction and that meshes with the pair of first bevel gears,
the gear support shaft is supported by the second case member via insertion into shaft support holes in the second case member, and the gear support shaft is disposed so as to overlap the outer peripheral gear teeth as viewed in the radial direction.

2. The differential gear unit according to claim 1, further comprising a restricting member that is inserted through both the second case member and the gear support shaft in the axial direction in order to restrict movement of the gear support shaft with respect to the second case member in the radial direction, a regulating hole in the second case member through which the restricting member is inserted has a bottom on the first axial side and an opening on the second axial side, wherein the clamped portion, the first fitted portion and the first fitting portion are arranged so as to overlap the restricting member as viewed in the radial direction.

3. The differential gear unit according to claim 1, wherein:
a head of a bolt that serves as the fastening member is located on the first side in the axial direction with respect to the first clamping portion of the second case member; and
the head is disposed so as to overlap the outer peripheral gear teeth as viewed in the radial direction.

4. The differential gear unit according to claim 2, wherein:
a head of a bolt that serves as the fastening member is located on the first side in the axial direction with respect to the first clamping portion of the second case member; and
the head is disposed so as to overlap the outer peripheral gear teeth as viewed in the radial direction.

\* \* \* \* \*